United States Patent
Marotz et al.

(10) Patent No.: US 11,822,674 B1
(45) Date of Patent: Nov. 21, 2023

(54) BLOCKCHAIN PROVENANCE INFORMATION FOR DATABASE

(71) Applicant: ARCHITECTURE TECHNOLOGY CORPORATION, Eden Prairie, MN (US)

(72) Inventors: Ryan C. Marotz, Bloomington, MN (US); Barry A. Trent, Chanhassan, MN (US)

( * ) Notice: Subject to any disclaimer, the term of this patent is extended or adjusted under 35 U.S.C. 154(b) by 295 days.

(21) Appl. No.: 17/075,580

(22) Filed: Oct. 20, 2020

Related U.S. Application Data

(63) Continuation of application No. 15/851,850, filed on Dec. 22, 2017, now Pat. No. 10,810,314.

(51) Int. Cl.
*G06F 21/60* (2013.01)
*G06F 16/22* (2019.01)
*G06F 21/62* (2013.01)

(52) U.S. Cl.
CPC .......... *G06F 21/602* (2013.01); *G06F 16/22* (2019.01); *G06F 21/6218* (2013.01)

(58) Field of Classification Search
CPC ..... G06F 21/602; G06F 16/22; G06F 21/6218
See application file for complete search history.

(56) References Cited

U.S. PATENT DOCUMENTS

| | | | |
|---|---|---|---|
| 7,864,952 B2 | 1/2011 | Pauker et al. | |
| 2006/0039554 A1 | 2/2006 | Fry | |
| 2006/0206485 A1 | 9/2006 | Rubin et al. | |
| 2017/0346625 A1 | 11/2017 | Yan | |
| 2018/0129712 A1* | 5/2018 | Mankovskii | G06F 16/24568 |
| 2018/0285839 A1* | 10/2018 | Yang | G06Q 20/3829 |
| 2018/0323963 A1* | 11/2018 | Stollman | H04L 9/3239 |

OTHER PUBLICATIONS

U.S. Patent and Trademark Office, "Office Action", U.S. Appl. No. 15/851,850, filed Jan. 24, 2020, 11 pgs.
"Apache Accumulo(R) User Manual Version 1_8", The Apache Software Foundation, "https://accumulo.apache.org/1.8/accumulo_user_manual.html#_jsr_223_support_in_the_shell", pp. 1-4, Sep. 25, 2017.
"Cell-level Security", Sqrrl Data, Inc., pp. 1-7, Oct. 4, 2017, USA.
"SQL Server Encryption", Microsoft, Accessed via the internet at: https://docs.microsoft.com/en-us/sql/relational-latabases/security/encryption/transparent-data-encryption, pp. 1-181, Oct. 4, 2017, USA.
Goyal, et al., "Attribute-Based Encryption for Fine-Grained Access Control of Encrypted Data", Association for Computing Machinery, pp. 1-10, 2006, USA.

(Continued)

*Primary Examiner* — Beemnet W Dada
(74) *Attorney, Agent, or Firm* — Carlson, Caspers, Vandenburgh & Lindquist, P.A.

(57) ABSTRACT

Embodiments for a method of tracking provenance information for data in a database are disclosed. The method includes storing data in a first one or more cells of a database, translating provenance information for the data into a new block for a provenance blockchain corresponding to the first one or more cells, and storing the new block in the database.

18 Claims, 7 Drawing Sheets

(56) References Cited

OTHER PUBLICATIONS

Guo, et al., "Fine-grained Database Field Search Using Attribute-Based Encryption for E-Healthcare Clouds", Journal of Medical Systems, Nov. 2016, pp. 1-9, USA.

McConaghy, et al., "BigchainDB: A Scalable Blockchain Database", ascribe GmbH, pp. 1-66, Jun. 8, 2016, Berlin, Germany.

Pawar, Nehal, "Enforcing Access Policies Using KP-ABE for Data on Entrusted Cloud", International Journal of Innovative Research in Computer and Communication Engineering, vol. 5, Issue 3, Mar. 2017, pp. 1-5, India.

Selvi, et al., "Efficient Multi-level Threshold Attribute Based Encryption", pp. 1-10, Accessed via the internet at: https://www.cs.utexas.edu/~vsub/#Research, Sep. 25, 2017, USA.

U.S. Patent and Trademark Office, "Notice of Allowance", U.S. Appl. No. 15/851,850, dated Sep. 15, 2020, 17 pgs.

\* cited by examiner

INSERT INTO my_table
 (column1, column2)
VALUES (
  my_value1,
  SecureProtect (
   my)_value2,
   security_attributes)
);

202

INSERT INTO my_table
 (column1, column2)
VALUES
 (my_value1,
  2M8SKURF597UC42C);

204

BLOCKCHAIN PROVENANCE INFORMATION FOR DATABASE

GOVERNMENT CONTRACTS

This invention was made with government support under contract W56KGU-17-C-0064 awarded by the Army Contracting Command—Aberdeen Proving Ground. The government may have certain rights in the invention.

RELATED APPLICATIONS

This application is a continuation of U.S. patent Ser. No. 10,810,314 filed on Dec. 22, 2017, entitled "DATABASE CONNECTOR USING ATTRIBUTE-BASED ENCRYPTION", which is hereby incorporated herein by reference.

BACKGROUND

Database connectors are a software program used to abstract the database connection for applications, enabling an application to use a common set of statements to interact with any of a diverse set of databases. This makes it easier to design applications for interaction with databases, because it does not require each application to be designed with the set of statements for every possible database it may interact with. Instead, the application can be designed with a single set of statements corresponding to the database connector, and the database connector can then translate statements received in the common set of statements into statements that correspond to the database with which the application is interacting. Accordingly, the task of ensuring compliant interaction with a diverse set of databases is pushed from each application to a single database connector. A database connector, therefore, is middleware between applications and databases (or more specifically database management systems (DBMSs). One example database connector is the well-known open database connectivity (ODBC).

Encryption is used with databases to secure the data at rest within the database. Current database encryption techniques, however, often limit the functionality of the database and/or still have large vulnerabilities. For example, encryption of an entire database with a single key, provides the same level of security to all of the data, even if only a portion of the data in the database requires the security. Proposals to address this include encrypting rows or columns of data in a database individually, or individually encrypting a single cell of a database.

These previously proposed encryption solutions, however, typically use a symmetric or private key to decrypt the data, which has certain disadvantages. For example, every application that desires to obtain the encrypted data from the database, must have a copy of the symmetric or private key. It is difficult to ensure everyone that should have access to the data has a copy of the symmetric or private key. Accordingly, there is a desire in the art for a better database encryption scheme that allows different data to be protected at different levels.

BRIEF DESCRIPTION

Embodiments for a method of tracking provenance information for data in a database are disclosed. The method includes storing data in a first one or more cells of a database, translating provenance information for the data into a new block for a provenance blockchain corresponding to the first one or more cells, and storing the new block in the database.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
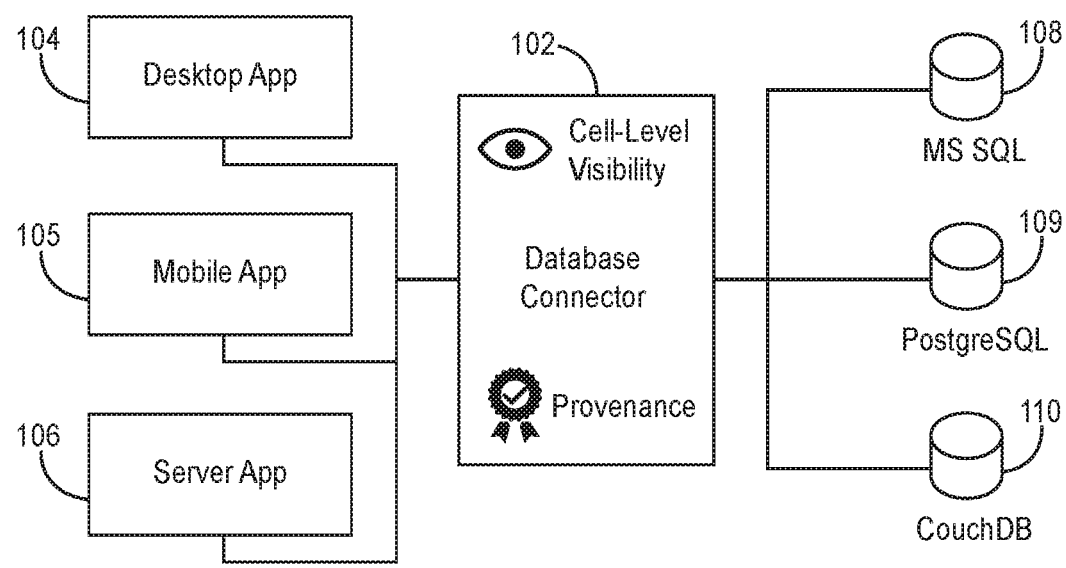
FIG. 1 is a block diagram of an example database connector interacting with a plurality of databases and a plurality of applications.

FIG. 1 is a block diagram of an example database connector 102 interacting with a plurality of applications 104-106 and a plurality of databases 108-110 to enable the applications 104-106 to store, manipulate, and retrieve data in the databases 108-110. The database connector 102 is middleware, coordinating communication between the applications 104-106 and the database management systems (DBMSs) for the databases 108-110. The database connector 102 receives database statements (e.g., SQL statements) from the applications and performs actions on the databases 108-110 in response to the statements. The actions performed by the database connector 102 on the databases 108-110 can include any action supported by the database 108-110, and are performed by sending appropriate statements (e.g., SQL statements) to the databases 108-110 to cause the databases 108-110 to perform the actions. That is, the database connector 102 sends statements to the databases 108-110 to cause the databases 108-110 to perform the desired actions. The database connector 102 also receives statements from the databases 108-110 and translates those statements to statements conforming to the statement protocol used with the applications 104-106.

The communications between the database connector 102 and the databases 108-110 are communications that conform to the statement protocol required by the respective database 108-110. The databases 108-110 can be any appropriate type of database including Microsoft SQL, PostgreSQL and MySQL, and the statement protocol use can be the corresponding protocol for that database including, but not limited to, structure query language (SQL) statements and extensions thereof.

The statements sent between the database connector 102 and the applications 104-106, however, are not limited to the statements used by the databases 108-110. At least the core statements sent between the database connector 102 and the applications 104-106 are not dependent on the type of database 108-110 with which the application 104-106/database connector 102 is interacting. Instead, these statements can be designed to take a different form, including taking the form of SQL extension statements and/or a set of proprietary statements. A common set of core statements can be used for communication between a single database connector 102 and multiple (e.g., all) applications 104-106. Thus, all the applications 104-106 can interact with the database connector 102 using the same set of core statements. This simplifies the protocol requirements for statements to/from the applications 104-106, as a single core statement protocol can be used to interact with any of a diverse set of databases 108-110. Outside of the core statements, there may be some ancillary statements used between the database connector 102 and the applications 104-106 that are not common to all the databases 108-110. The ancillary statements may be used for interacting with a subset of one or more databases, such as where one database 108-110 allows an action/statement that is not allowed by another database 108-110.

The database connector 102 utilizes its position as middleware between an application 104 and a database 108 to enable storing of encrypted data in the database 108 via encryption and decryption of data as it transferred between a database 108-110 and an application 104-106. For data being stored in a database 108, the database connector 102 can receive the data from an application 104 in plaintext form, encrypt the data, and then store the encrypted version of the data in the database 108. For encrypted data being retrieved from the database 108, the database connector 102 can receive the encrypted version of the data from the database 108, decrypt the data, and send the data in plaintext form to the application 104.

To enable secure, controlled access to the encrypted data for multiple users, the database connector 102 encrypts the data using attribute-based encryption (ABE). In attribute-based encryption, data is encrypted such that it can only be decrypted with a private key that encodes the correct one or more attributes. Private keys for the ABE system are generated in such a way that they encode a selected one or more attributes. The attributes of a private key are typically attributes of the user or entity to which the private key corresponds. When an ABE system is set-up, a plurality of attributes is chosen for the system. Each attribute is a different string of characters, typically a word, phrase, or numeral. Example attributes for a system include an individual's name (e.g., John Doe), a work group (e.g., Electrical Division), and a location (e.g., Minneapolis). Other example attributes are an organization, department, rank, secrecy level, and active tasks for a user or entity. Example name attributes include John Doe, Jane Doe, Corporation A, etc. Example location attributes include, Minneapolis, West Campus, Building 112, etc. In any case, a user's or entity's private key can encode the attribute(s) that correspond to that user or entity. For example, a set of attributes encoded in user John Doe's private key can include: name=John Doe, location=Minneapolis, secrecy level=secret, and active tasks=Project Tackle.

When data is encrypted using attribute-based encryption, the data is encrypted such a private key that encodes the correct set of attributes can decrypt the data, while private keys that do not encode the correct set of attributes are not able to decrypt the data. Thus, the encrypted data is not necessarily linked to a single private key. Instead, any of potentially multiple private keys can decrypt the data, as long as the multiple private keys encode the correct attributes. Moreover, the multiple private keys need not be the same. The multiple private keys can each encode a different set of attributes, as long as the attributes in the set of attributes (for each private key respectively) include at least the attributes required to decrypt the data. For example, an item of data may be encrypted such that any private key encoding the secrecy level=secret can decrypt the data. Accordingly, John Doe and any other user having secret clearance (secrecy level) and a corresponding private key encoding the attribute secrecy level=secret can decrypt the data. Moreover, John Doe's private key can also encode the attributes, name=John Doe, and location=Minneapolis. If those additional attributes are not needed for decrypting that particular item of data, however, they are irrelevant for this instance of decryption. Thus, Jane Doe's private key could encode the attributes name=Jane Doe, location=Seattle, and secrecy level=secret. Jane Doe would also be able to decrypt the data by virtue of her secret clearance even though here private key is different (it encodes different additional attributes) than John Doe's.

Attribute-based encryption can be more sophisticated than requiring a single attribute. For example, the encryption can require that the attributes of a private key meet a logical combination of attributes. Such a logical combination of attributes is commonly referred to as a logical attribute statement. The logical attribute statement can include any set of attributes logically linked together with Boolean logic including AND and OR. For example, a logical attribute statement can include (secrecy level=secret AND active tasks=Project Tackle). A private key encoding both the secrecy level=secret attribute and the active task=Project Tackle attribute could decrypt the corresponding data, but a private key that encoded one of secrecy level=secret attribute or active task=project attribute, but not the other attribute would not be able to decrypt the data.

The logical attribute statement can also include relational operators like greater than, less than, greater than or equal to, and less than or equal to. These operators can be used for attributes that are non-negative numerical values. For words or phrases that have a hierarchical relationship, such as ranks in the military, government secrecy levels, organizational titles, the words can be assigned a number, hidden by the ABE system, such that the user of the system can use the word in place of the attribute, but the true attribute is a number that be accurately compared using the greater than, less than, etc. operators. For example, a logical attribute statement could include an expression that allows any attribute of a certain security level or higher to decrypt the data. Such an expression could be ">=secrecy level=secret. This would allow any private key encoding a secrecy level greater than or equal to secret to decrypt the data. Thus, a first private key encoding secrecy level=secret could decrypt the data and a second private key encoding the secrecy level=top secret could also decrypt the data.

In any case, attribute-based encryption encrypts each item of data based on a logical attribute statement corresponding to that data. Different items of data can be given different logical attribute statements, enabling decryption of different items of data with private keys encoding different attributes.

The database connector 102 is set-up with a set of attributes for the ABE system it is implementing. For example, a given entity (e.g., corporation) may have an ABE system for its organization. The database connector(s) 102 for that entity, therefore, are set-up with the attributes for the entity, such that the database connector(s) 102 encrypt data using the attributes for the ABE system of the entity. Database connectors 102 used in other ABE systems (e.g., for other entities) would be set-up with different attributes corresponding to the ABE system they are implementing.

The database connector 102 implements its ABE system by encrypting data with logical attribute statements including attributes of the ABE system it is implementing. To perform ABE encryption, the database connector 102 obtains a public encryption key from a trusted authority set up to provide keys for the ABE system. To encrypt an item of data, the database connector 102 implements the ABE encryption using the data, the public encryption key, and the desired logical attribute statement as inputs. The output of the ABE encryption process is data in encrypted form that can be decrypted with a private key in the ABE system that encodes the attribute(s) that meet the requirements of the logical attribute statement used to encrypt the data.

To perform ABE decryption on data in encrypted form, the database connector 102 obtains a private key and implements the ABE decryption process with the private key and the encrypted data. If the private key encodes attributes meeting the requirements of the logical attribute statement used to encrypt the encrypted data, the decryption will be successful and the output of the ABE decryption process will be the plaintext version of the encrypted data. If the private key does not encode attribute(s) that meet the requirements of the logical attribute statement used to encrypt the data, the decryption will be unsuccessful and the ABE decryption process can output an indication of unsuccessful decryption.

ABE schemes can use a single public encryption key to encrypt all data, while the logical attribute statement for each item of data can be individually selected, such that different items of data can be encrypted with different logical attribute statements. Since a single public encryption key can be used to encrypt all data, the database connector 102 can store its own copy of the public encryption key for use when encrypting data. The database connector 102, however, is not an end user of data and therefore most often will not have its own private key. Instead, the database connector 102 receives a private key from an application desiring to retrieve encrypted data from the database 108 and attempts decryption of the data requested by that application with the private key received from that application. Accordingly, the private keys may not be stored in the databases 108-110 or on a server housing a database 108-110, such that if the database 108-110 or server is compromised the encrypted data will remain safe as they private keys will not also be compromised.

An example data storage process is as follows: an application 104 desiring to store data in a database 108 generates a request that the database connector 102 store the data in the database 108. A request to store data in a database 108-110 is also referred to herein as a "store statement". Example store statements include the INSERT and UPDATE statements in SQL. The application 104 generates the store statement such that it conforms to the common set of statements for the database connector/application API. The application 104 sends that store statement along with the data to the database connector 102. In response to receiving the store statement, the database connector 102 can perform ABE encryption on the data with its public encryption key using a logical attribute statement for the data. More detail regarding the genesis of the logical attribute statement is provided below. The database connector 102 can then generate a statement requesting that the database 108 store the encrypted version of the data in the database 108 and send that store statement along with the encrypted version of the data to the database 108. The store statement generated by and sent to the database 108 is in a format complying with the database 108. The database 108 will then store the encrypted version of the data in accordance with the store statement from the database connector 102.

Figure 2:
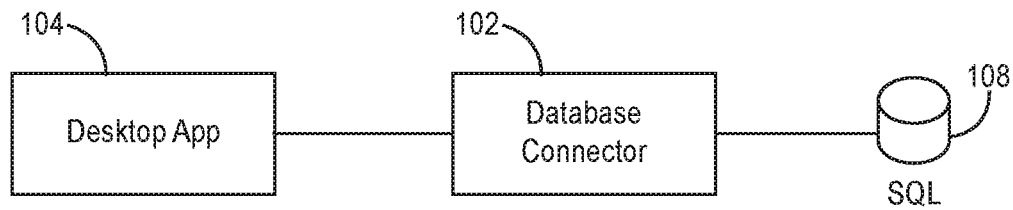
FIG. 2 is a block diagram of the database connector, an application, and a database from FIG. 1 illustrating an example statement requesting that data be stored with the database connector and encrypted using attribute-based encryption (ABE)

FIG. 2 illustrates example store statement for sending from an application 104 to the database connector 102 to encrypt data using attribute-based encryption. An application 104 can send the store statement 202 "INSERT INTO my_table (column1, column2) VALUES (my_value1, SecureProtect (my_value 2, security attributes));" to the database connector 102. This statement 202 instructs the database connector 102 to insert the data "my_value1" into column 1 of a table in database 108. The statement 202 also instructs the database connector 102 to encrypt the data "my_value2", and includes the attributes "security_attributes" for the attribute-based encryption. The line "SecureProtect (x, y)" in the data place of either the 'X' or 'Y' data spot in the "VALUES (X, Y)" function in the statement 202 instructs that database connector 102 to encrypt the data, x, and provides the attributes, y, along with it. The store statement 202 also instructs to store the encrypted data in column2 of the table in database 108. As the data "my_value1" in the statement 202 is not included within the function "SecureProtect (x, y)", the application 104 has not instructed the database connector 102 to encrypt "my_value1". In response to store statement 202, the database connector 102 encrypts "my_value2" using attribute-based encryption and generates a store statement 204 requesting that the database 108 store "my_value1" and the encrypted version of "my_value2". Statement 204 is "INSERT INTO my_table (column1, column2) VALUES (my_value1, 2M8SKURF597UC42C);. This statement is a statement conforming to the protocol of the database 108 and instructs the database 108 to store "my_value1" in column1 and the encrypted version of "my_value2" (2M8SKURF597UC42C) in column2 of the table in the database 108.

The syntax for the store statement 204 sent to the database 108 is set by the protocol of the database 108. The syntax of the store statement 202 sent to the database connector 102, however, can be set by the programmer of the database connector 102. FIG. 2 shows an example syntax for the store statement 202 where a conventional SQL statement is extended to include the function "SecureProtect (x, y)" in place of data.

Another option for the syntax of store statement 202 is that a custom statement can be generated to request the database connector 102 to store and encrypt an item of data. An example of such a custom statement could be "SecureSQLinsert (my_sql_statement, attributes)". The item "my_sql_statement" is a conventional SQL insert statement embedded within the custom statement. The overall custom statement instructs the database connector 102 to encrypt each item of data in the conventional SQL statement and provide attributes for that encryption. The store statement 204 generated by the database connector 102 and sent to the database 108 would have the same syntax as that shown in FIG. 2 in order to comply with the protocol of the database 108. Other syntax can also be used.

The logical attribute statement used during encryption can be generated by the database connector 102. It can be generated based on information obtained from the application 104 sending the data to-be-stored and/or based on other information available to the database connector 102. A set of rules can be programmed into (i.e., included within) the database connector 102 to govern the generation of logical attribute statements. The rules are instructions that direct how the database connector 102 constructs logical attribute statements. That is, the rules dictate which attributes, logical relations (e.g., AND, OR, greater than), and relational operators are used and how the attributes, logical relations, and relational operators are arranged within the logical attribute statement.

Attributes, logical relations, relational operators, and/or logical expressions for use in generating a logical attribute statement can be obtained from the application sending the store statement, from a user, or can be imbedded within the rules themselves. In an example, the application 104 can be programmed to send attributes, logical relations, and/or relational operators to the database connector 102 for use in generating logical attribute statements. The application 104 can determine which attributes, logical relations, and/or relational operators to send. In an example, the attributes, logical relations, and/or relational operators can be sent with the store statement requesting storing of the data. That is, when sending a statement requesting the database connector 102 to store data in the database 108-110, the application 104-108 can include the data to-be-stored as well as one or more attributes to be used for the logical attribute statement when encrypting the data. In some examples, the database connector 102 can prompt a user directly for attributes, logical relations, and/or relational operators. A prompt to a user can indicate to the user which attribute classes (e.g., individual name, location, rank, secrecy level, etc.) the user should include attributes for, or the prompt can be more open and the user can provide any attribute desired.

The rules can instruct the database connector 102 to construct logical attribute statements based on the one or more attributes, logical relations, and/or relational operators provided with the store statement from the application 104-106. In addition to, or instead of, being based on the information with the store statement from the application 104-106, the rules can instruct the database connector 102 to construct logical attribute statements based on other information. The other information can include information obtained from a user prompt and/or information that is embedded within the rules. Information that is embedded within the rules can include a global attribute or a logical expression (e.g., a partial logical statement) that is to be included in a corresponding logical attribute statement. An example of such a global attribute or logical expression embedded in a rule, is a rule that instructs the database connector 102 to append the logical expression "OR attribute-X" to whatever attribute(s) or logical expression is received from the application 104. For example, if the application includes the logical expression "location= Minneapolis AND active tasks=Project Tackle" and rule instructs the database connector 10 to append to append an "OR name=John Doe" to whatever attribute(s) or logical expression is received from the application, the database connector 102 will generate the logical attribute statement "location=Minneapolis AND active tasks=Project Tackle OR name=John Doe" for encryption of the corresponding data. Thus, the data once encrypted, can be decrypted only by the private key of someone in Minneapolis assigned to Project Tackle or the private key of John Doe.

The rules can instruct the database connector 102 to construct different logical attribute statements depending on the content of the store statement from the application 104-106. For example, the logical attribute statement constructed can be based on the type of data to be encrypted. As databases are commonly organized based on the type of data stored, the type of data can be identified based on the location in the database in which the data is to-be-stored. Accordingly, the rules can instruct the database connector 102 to construct the logical attribute statement based on the location that the store statement indicates to store the data. For example, a first store statement can indicate storage in column A of a database 108 and a second store statement can indicate storage in column B of the database 108. The rules in the database connector 102 can instruct the database connector 102 to construct a first logical attribute statement for data to be stored in column A and a second logical attribute statement for data to be stored in column B. This enables the database connector 102 to, for example, encrypt a phone number, which is stored in column A, with different attributes than a social security number, which is stored in column B. The location based logical attribute statement generation can be done on a cell-level (i.e., a rule can dictate a logical attribute statement for an individual cell), a column/row-level (i.e., a rule can dictate a logical attribute statement for an individual column/row), a database-level (i.e., a rule can dictate a logical attribute statement for an individual database), or a combination of these (e.g., one rule can dictate a logical attribute statement for an individual cell and another rule can dictate a logical attribute statement for an individual column, etc.).

In an example, the rules for logical attribute statement construction can dictate how the database connector 102 uses attribute(s) included in the store statement from an application 104-106. For example, a given store statement may not provide any logical relation between two or more attributes provided therewith. The rules, however, could provide the logical relation, instructing the database connector 102 to AND together the attributes for location and active tasks that are include in the store statement.

In an example, the rules can instruct the database connector 102 to ignore or overrule attributes or logical expressions included with a store statement by an application 104-106. For example, if a store statement for an application 104-106 includes the attribute of secrecy level=confidential for data to be stored in column C, the rule could direct the database connector 102 to overrule any secrecy level attributes less than 'secret' for data stored in column C to ensure the data in column C is at least secrecy level=secret.

In an example, the rules can instruct the database connector 102 to prompt a user for attribute(s), relational operator(s), and/or logical relation(s) to be used in a logical attribute statement. In response to receiving a store statement from an application 104-106, the database connector 102 can directly prompt a user for attributes, relational operators, and/or logical relations to be used in the logical expression for that data. The prompt can include information about the store statements such as the data to be stored and the location the data is to be stored in. Upon receiving a response from the user to the prompt, the database connector 102 can construct a logical attribute statement according to the rule with the information obtained via the prompt as well as other information, such as attributes embedded in the rule and/or attributes received from the application 104-106. Advantageously, having the database connector 102 prompt a user directly for attribute(s), logical relation(s), and/or relational operator(s) may enable fewer modifications to conventional applications 104-106 to enable compatibility with the attribute-based encryption of the database connector 102, because the conventional applications 104-106 may not need to be modified to include the attributes/logical expressions with the store statement, or to prompt a user for the attributes to include with the store statement. Instead, the database connector 102 takes care of obtaining the attributes/logical expressions so the application 104-106 does not need to.

In an example, the application 104-106 can provide an instruction with the store statement indicating whether the corresponding item of data is to be encrypted. In such an example, the database connector 102 can encrypt or not encrypt the data (i.e., store the plaintext version of the data in the database 108-110 based on the instruction from the application 104-106.

In another example, the database connector 102 itself can determine whether to encrypt an item of data without being requested to do so by an application. That is, the store statement sent by the application 104-106 does not need to request encryption of the data (e.g., using the syntax discussed above with respect to FIG. 2). Instead, the database connector 102 determines whether to encrypt the item of data. In an example, the database connector 102 determined whether to encrypt the item of data based on a location in the database 108-110 in which the item of data is to be stored. For example, a first store statement can indicate storage in column A of a database 108 and a second store statement can indicate storage in column B of the database 108. The rules in the database connector 102 can instruct the database connector 102 to encrypt data to be stored in column A and not encrypt data to be stored in column B. This enables the database connector 102 to, for example, encrypt a social security number, which is stored in column A, but not a phone number, which is stored in column B. The location based encryption can be done on a cell-level (i.e., a rule can dictate encryption/decryption for an individual cell), a column/row-level (i.e., a rule can dictate encryption/decryption for an individual column/row), a database-level (i.e., a rule can dictate encryption/decryption for an individual database), or a combination of these (e.g., one rule can dictate encryption for an individual cell and another rule can dictate no encryption for an individual column, etc.). Advantageously, having the database connector 102 determine whether to encrypt an item of data can enable the encryption and decryption process to be completely transparent to the application 104-106, requiring minimal coding change for the application 104-106.

Referring back to FIG. 1, an example data retrieval process is as follows: an application 104 desiring to retrieve data from a database 108 generates a statement instructing the database connector 102 to retrieve the data from the database 108, and sends the statement to the database connector 102. The statement conforms to the common set of statements for the database connector/application API. In response to receiving the statement, the database connector 102 generates a statement instructing the database 108 to retrieve the data, and sends the statement to the database 108. This statement is in a format complying with the statement protocol used by the database 108. The database 108 retrieves the data in response to the statement and sends the data to the database connector 102. The retrieved data is encrypted, so the database connector 102 attempts to decrypt the data prior to forwarding the data to the application 104. The database connector 104 attempts decryption of the data with a private key corresponding to the application 104 requesting the data. This private key can be a private key for the application 104, for a user logged-in to the application 104, for a user logged-in to an operating system environment in which the application 104 is executing, for a device on which the application 104 is running, or for another entity corresponding to the application 104. If the private key encodes the correct attribute(s) as discussed above, the decryption will be successful and the database connector 102 sends the plaintext version of the data to the application 104. If the private key does not encode the correct attribute(s), the decryption will not be successful, so the application 104 will not receive the plaintext version of the data from the database connector 102. In an example, the database connector 102 can send an indication to the application that the application 104/user is not allowed to access the data in such a situation. Such an indication can include providing a NULL value to the application 104 in place of the data.

In this way, the database connector 102 uses its own local copy of the public encryption key to encrypt data and uses a private key corresponding to an application 104 requesting data to decrypt data. As mentioned above, the public encryption key is obtained from a trusted authority set up to provide keys for the ABE system. If multiple database connectors 102 are used in a single ABE system, each of the multiple database connectors 102 can have the same public encryption key. The trusted authority also provides the private keys for the ABE system. A respective private key is provided to each application/user/device/entity using the ABE system, and each private key encodes the attributes of the application/user/device/entity to which the private key corresponds. That is, each private key can encode a different set of attributes—the attributes for the application/user/device/entity to which it corresponds. These individualized private keys ensure an application/user/device/entity is able to obtain plaintext data when its private key has the correct attribute(s) for the corresponding encrypted data, and is not able to obtain the plaintext data when its private key does not have the correct attribute(s) for that encrypted data.

The private key of an application/user/device/entity can be obtained by the database connector 102 in any appropriate manner. For example, the application 104 can provide a private key with each request to retrieve data in a database 108-110, and the database connector 102 uses the private key provided with a given request to access data to attempt to decrypt the data corresponding to that request. A request to retrieve data in a database 108-110 is referred to herein as a "retrieve statement". An example retrieve statement is the SELECT statement in SQL. Sending the private key with each retrieve statement is advantageous because the database connector 102 is only required to keep a copy of the private key during the short period in which the retrieve statement is being acted upon. Once the database connector 102 has responded to the retrieve statement, the private key can be destroyed. Having the database connector 102 keep private keys for such a short period provides increased security for the private key because a copy of the private key is not present in the database connector 102 for long.

Figure 3:
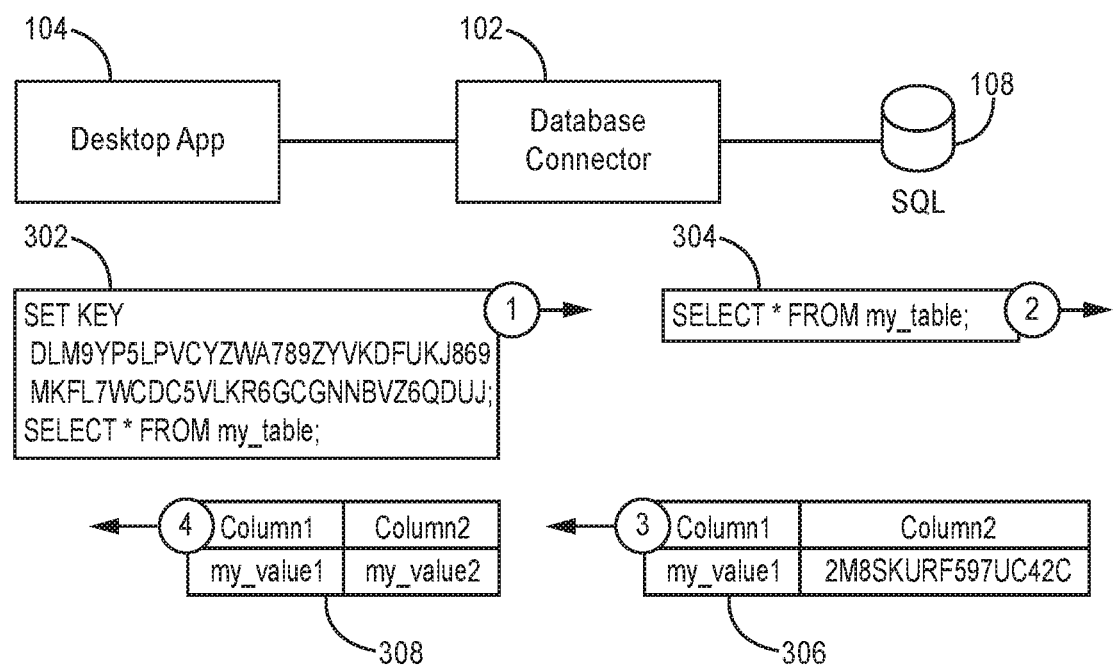
FIG. 3 is a block diagram of the database connector, an application, and a database from FIG. 1 illustrating an example statement requesting that data encrypted with ABE be retrieved and decrypted by the database connector.

FIG. 3 is a diagram of an example retrieve statement that provides a private key to the database connector 102. An application 104 can send a retrieve statement 302 to the database connector 102 requesting to retrieve the data in column1 and column2 of a table ("my_table") in the database 108. The statement 302 can include a "SELECT (x, y, . . . ) FROM table" function instructing the database connector 102 to retrieve the data in the x, y locations from the table. The statement 302 can also include a private key "DLM . . . " for decryption if any of the data requested is encrypted. In response to statement 302, the database connector 102 generates a retrieve statement 304 that complies with the protocol of the database 108, and requests that the database 108 return the data in column1 and column2. In response to the retrieve statement 304, the database 108 sends the return statement 306 including the data in column1 and column2. The data in column1 is in plaintext form, so the database connector 102 does not decrypt that data. The data in column2, however, is encrypted, so the database connector 102 attempts decryption of the data in column2 using the private key "DLM . . . " included in the retrieve statement 302 from the application 104. In this example the decryption is successful, so the database connector 102 generates and sends statement 308 to the application 104 as a response to statement 302 from the application 104. The statement 308 includes the plaintext column1 data as retrieved from the database 108 and the decrypted plaintext version of the encrypted data for column2 retrieved from the database 108. Other syntax/formats for the statements 302, 304, 306, 308 can be used.

In an alternative example, the database connector 102 obtains a copy of the private key of an application/user/device/entity for use with multiple access requests from an application/user/device/entity. For example, the database connector 102 can obtain a copy of the private key of an application/user/device/entity along with database credentials passed to the database connector 102 in the connection string from the application/user/device/entity for logging in to the databases 108-110. An example connection string passing a private key is ConnectionString= "DRIVER={SecureDBC};SERVER=localhost;DATABASE=testdb; USER=testuser;PASSWORD=testpass;PRIVKEY=DLM9 YP5LPVCYZWA789ZYVKDFUKJ869MKFL7WCD-C5VLKR6GCG NNBVZ6QDUJ;" The database connector 102 can store the copy of the private key for as long as the object session corresponding to the connection string is alive. Once the object session is closed, the database connector 102 can destroy the corresponding private key.

In a second alternative example, the database connector 102 can receive the private key automatically at the time in which the application/user/device/entity is activated. The time in which the application/user/device/entity is activated can be when a user logs-in to the device, operating system, or application. In a third alternative example, the database connector 102 can prompt the user for the private key. In either of these second or third alternative examples, the private key obtained by the database connector 102 can be used for any application 104-106 that is operating within a user space of the user (e.g., an operating system environment that the user is logged-in to). For example, an application 104-106 executing in a user space of a user can send a statement to the database connector 102 requesting retrieval of data from the database 108-110. In response to the statement, the database connector 102 can retrieve the corresponding encrypted data from the database 108 and attempt to decrypt the data with a private key for the user corresponding to the user space (e.g., logged-in to the user space).

Once the database connector 102 obtains the private key, the database connector 102 can store that private key for as long as the application/user/device/entity is active (e.g., as long as the user is logged-in), and use the private key for multiple (e.g. all) requests to access data for that application/user/device/entity during that period.

The advantage of these alternative examples is that the database connector 102 does not have to re-obtain a copy of the private key from the application 104 for each request to retrieve data, simplifying communications between the application 104 and the database connector 102. A further advantage of the third alternative example is that having the database connector 102 obtain the private key directly can enable fewer modifications to conventional applications, because the conventional applications may not need to be modified to obtain the private key and/or provide the private key to the database connector 102.

In an example, the database connector 102 can maintain a list of which data in a database is encrypted in order to determine whether to decrypt the data upon retrieval thereof from the database 108-110. This can enable encrypted data to be stored in an existing database 108-110 having similar data therein that is not encrypted. Each time the database connector 102 stores encrypted data in a database 108-110, the database connector 102 can update a list of cells that include encrypted data such that the list includes the cell in which the encrypted data is stored. Thus, the list can identify all cells in the database 108-110 that contain encrypted data. The list can be stored in the database to which it corresponds or in a maintenance database used for housekeeping information for the database connector 102. If multiple database connectors 102 are used for a single database 108-110, the multiple database connectors 102 can access a common list, so that each database connector 102 has an accurate list of the cells that contain encrypted data in the database 108-108. When the database connector 102 receives a request to retrieve data from a cell in the database 108-110, the database connector 102 can refer to the list of cells containing encrypted data. If the cell from which data is being requested in identified in the list as having encrypted data, the database connector 102 can attempt decryption of the data returned from the database 108-110 using the appropriate private key. If the cell is not identified in the list as having encrypted data, the database connector 102 can pass the returned data on to the corresponding application without decryption.

In another example, the database connector 102 can enable encryption and decryption of data in a cell or group of cells even if the cell is not designed to support the encrypted data. For example, if a database includes a column for social security numbers, and the database requires the data in that column to be in the format, XXX-XX-XXXX, it may be difficult to store an encrypted version of a social security number in that column, because the encrypted data will likely not be in the format XXX-XX-XXXX. Accordingly, the database connector 102 can enable storing of such social security numbers in the database in encrypted form, even though the encrypted form isn't supported by that particular column of the database 108. The database connector 102 enables storing of such encrypted data by storing the encrypted data in an alternative location (e.g., in an alternative table in the database or in a maintenance database) and maintaining an association between the alternative location and the (intended) location in which the plaintext version of the data was to-be stored. The association between the alternative location and the (intended) location can be maintained via a list that is stored in a maintenance database used by the database connector 102. The database connector 102 can perform this for each item of encrypted data that does not comply with the format for a cell in the database in which the data is to-be stored, and maintain the list with the association between the alternative location of each item of data and the intended location of the corresponding plaintext version of the data. Thus, storage of the encrypted data in the alternative location can be transparent to the applications 104-106. If multiple database connectors 102 are used for a single database 108-110, the multiple database connectors 102 can access and update a common list stored in the maintenance database so that each database connector 102 has an up-to-date list of the cells containing encrypted.

The database connector 102 can maintain the list of which data in a database is encrypted and the alternative location of that data in order to determine whether to decrypt the data upon retrieval thereof from the database 108-110. Each time the database connector 102 stores encrypted data in a database 108-110, the database connector 102 can update a list of cells that include encrypted data such that the list includes the cell in which the encrypted data is stored. Thus, the list can identify all cells in the database 108-110 that contain encrypted data. When the database connector 102 receives a request to retrieve data from a cell in the database 108-110, the database connector 102 can refer to the list of cells containing encrypted data. If the cell from which data is being requested in identified in the list as having encrypted data, the database connector 102 can read the data's alternative location from the list and can send a retrieve statement to the database 108-110 requesting retrieval of the data in the alternative location. Upon receiving the encrypted data in the alternative location from the database 108-110, the database connector 102 can attempt decryption of the data with the private key corresponding to the application 104-106. If the decryption is successful, the database connector 102 can then send the plaintext version of the data to the application 104-106 in response to the request to retrieve data from the application 104-106. If the cell is not identified in the list as having encrypted data, the database connector 102 can pass the returned data on to the corresponding application without decryption. In this way, the database connector 102 can enable storing and retrieval of encrypted data in a database 108-110 that does not support the encrypted data.

Figure 4:
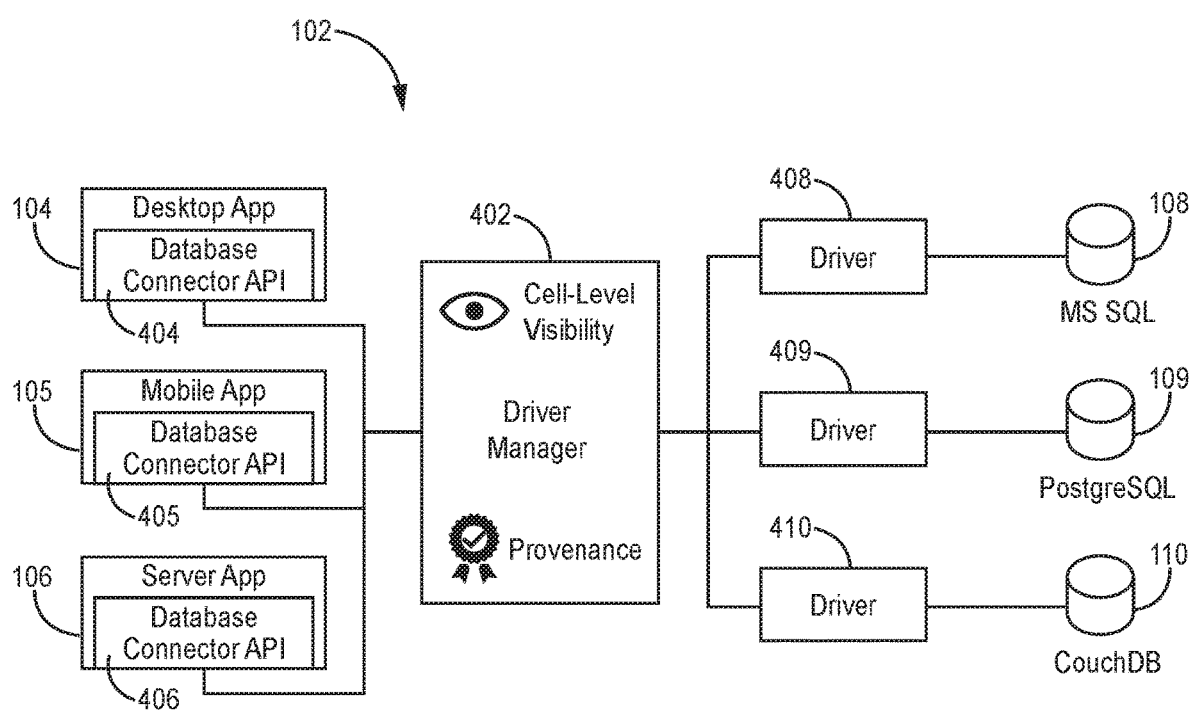
FIG. 4 is a block diagram of the database connector, applications, and databases of FIG. 1 illustrating internal blocks of the database connector.

FIG. 4 is a block diagram of an example database connector 102. The database connector 102 can include a driver manager 402 and a plurality of database drivers 408-410. The driver manager 402 is responsible for communicating with the applications 104-106, for encrypting and decrypting data, and for sending commands (e.g., store or retrieve commands) to the database driver 408-410 for the type of database 108-110 in which the corresponding action is to be performed. The driver manager 402 can also maintain any lists of cells containing encrypted data or any alternative cell locations.

The database connector 102 can include a distinct database driver 408-410 for each type of database (e.g., Microsoft SQL, PostgreSQL and MySQL) that the database connector 102 communicates with. Each database driver 408-410 is a translator between the driver manager 102 and any database having a matching type to the driver 408-410. Each database driver 408-410 translated between commands to/from the driver manager 402 and statements conforming to databases 108-110 having a matching type to the driver 408-410. For example, a first driver 408 can translate between commands to/from the driver manager 402 and statements conforming to Microsoft SQL databases. This first driver 408 can be communicatively coupled to each Microsoft SQL database interacting with the database connector 102, and the database connector 102 can send commands to and receive commands from the first driver 408 for actions in each such Microsoft SQL database. The first driver 408 can translate between the commands from the driver manager 402 and each Microsoft SQL database to generate and receive SQL statements conforming to the protocol of Microsoft SQL databases. Other drivers can be used to translate for other types of databases. Advantageously, having the drivers separated from the driver manager 408, enables the database connector 102 to be more easily updated to interact with additional database 108-110 or to account for database protocol updates, because only the driver 408-410 for the particular type of database 108-110 being added or updated may need to be added or changed.

The driver manager 402 can communicate with a database connector/application API 404-406 of each application 104-106 that the database connector 102 interacts with. Each application 104-106 has its own database connector/application API 404-406 that generates and receives statements conforming to the common set of statements used by the database connector 102. Specifically, each database connector/application API 404-406 sends and receives these statements with the driver manager 402. The driver manager 402, in turn, sends and receives statements with the database connector/application API 404-406 of each application. The statements conform to the common set of statements used by the database connector 102.

The database connector 102 can also flag some or all encrypted data in the cell with one or more keywords, to enable the encrypted data to be identified in a search for the one or more keywords. Since encrypted data is not searchable in the same manner as plaintext data, the encrypted data would not be brought up as a result in a search if the encrypted data were merely saved into the database 108-110 with nothing more. To enable the encrypted data to come up as a result for a search, the database connector 102 can associate one or more keywords to the encrypted data, such that a search for the one or more keywords returns the encrypted data as a result. The one or more keywords to be associated with an item of encrypted data can be provided to the database connector 102 by the application with a store statement or can be obtained by the database connector 102 directly from a user (e.g., via a prompt of the user). The associated keywords can be stored in a table in the database of the data to which they correspond to, or in a maintenance database used by the database connector 102.

Figure 5:
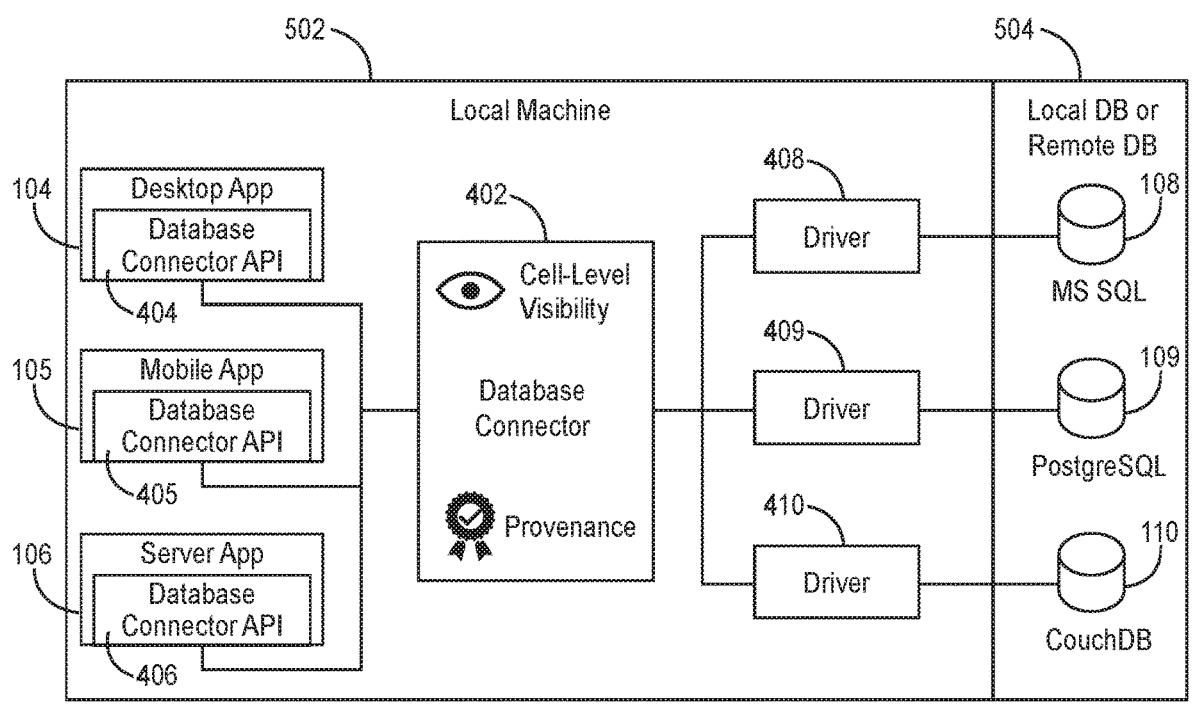
FIG. 5 is a block diagram of the database connector, applications, and databases of FIG. 1 illustrating the database connector and applications on a common computing device.

The databases 108-110, database connector 102, and applications 104-106 can all be on the same device or can be distributed across distinct devices that are communicatively coupled together over one or more networks. FIG. 5 is an example configuration where the applications 104-106 are located on a common device 502 with the database connector 102. One or more of the databases 108-110 (504) can also be located on the common device 502 with the applications 104-106 and the database connector 102 or can be located remotely from the device 502. In examples where the databases 108-110 are located remotely, the drivers 208-210 and the databases 108-110 can communicate via network messages over one or more network links. The databases 108-110 can be any appropriate databases, such as relational databases.

The database connector 102 can also maintain provenance information for data acted on in the database 108-110 by using a blockchain to record actions on the database 108. A blockchain is made up of individual blocks. To record provenance information for a transaction, a block for that transaction is added to the blockchain. Each block of the blockchain contains data about a transaction on that data, such as timestamp, details of the transaction, the hash of the previous transaction block, and a nonce. By design, the blockchains use of hashes and nonces makes them resilient to modification of data. The blockchains can track both workflow (coarse-grained) actions and data (fine-grained) changes. Workflow actions include why data was changed and data changes include how and when the data was changed. The blockchain information can be stored in the database 108-110 and associated with its corresponding data and/or cell. When a cell is accessed, the database connector 102 can also access the corresponding blockchain information and update the blockchain to reflect any changes to the data. The provenance tracking via blockchain updates can be performed by the driver manager 202 of the database connector 102.

In an example, the database connector 102 can determine the fine-grained (data) changes by comparing the data before the change to after the change. Since the database connector 102 has access to the data both before and after the change, the determination of what has changed in the data can be done by the database connector 102 independently of the application 104-106 requesting the change. That is, the application 104-106 can simply send the statement requesting the action to be taken in the database 108-110 and the database connector 102 can determine what change to the data the action causes and update the blockchain for that data accordingly. In another example, the application 104-106 determines the change to the data and sends the change to the database connector 102 along with the statement requesting the action to be taken.

Coarse-grained (workflow) updates to the blockchain are typically un-identifiable by the database connector 102 independently. Thus, the database connector 102 can either receive the information for the coarse-grained updates from the application 104-106 or the database connector 101 can prompt a user directly to obtain the coarse-grained updates. The database connector 102 can also sign its added blocks to the blockchain with a digital signature. Thus, the authenticity of the blockchain additions can be verified at a later time. In an example, selected items of provenance information can be encrypted before being added to the blockchain in order to protect the information. The provenance information can be encrypted with attribute-based encryption using the same logical attribute statement used to encrypt the corresponding data. In an example, if the data is not encrypted, the provenance information is also not encrypted, whereas if the data is encrypted, part or all of the provenance information can be encrypted as well.

Figure 6:
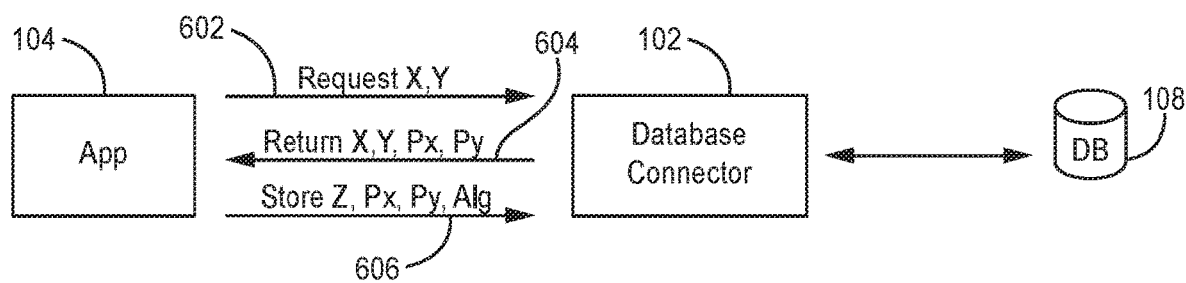
FIG. 6 is a block diagram of the database connector, an application, and a database from FIG. 1 illustrating example statements for storing provenance information in a blockchain.

FIG. 6 is a diagram of an example of passing provenance information between the database connector 102 and an application 104. An application 104 sends the appropriate statement(s) 602 to the database connector 102 requesting the data in cells 1 and 2 within a database 108. The database connector 102 can send the appropriate statement(s) to the database 108 and obtain the data, X, from cell 1 and data, Y, from cell 2. The database connector 102 also obtains the provenance information, Px, from the blockchain for cell 1 and the provenance information, Py, from the blockchain for cell 2. The database connector 102 passes the data X, Y, and the corresponding provenance information, Px, Py, to the application 104 in the appropriate statement(s) 604. The application 104 performs a transaction with data X and data Y and generates a new item of data, Z. The application 104 sends a statement 606 to the database connector 102 requesting that the data, Z, be stored in the database 108 and including provenance information for the data, Z. Since the data, Z, was generated based on a transaction involving both data X and data Y, the provenance information provided with statement 606 is the provenance information for X, Px, the provenance information for Y, Py, as well as the algorithm, Alg, used to create data Z from data X and data Y. In response to receiving the statement 606, the database connector 102 sends a statement to database 108 to store data Z and adds a block to the blockchain for the cell in which data Z is being stored. The added block includes the provenance, Px, Py, and Alg. In this way provenance information can be passed between the database connector 102 and the application 104 and the corresponding blockchains can be accessed and updated to access and update the provenance information.

In an example, the database connector 102 can set event triggers on one or more databases 108-110 so that the one or more databases 108-110 alert the database connector 102 to actions performed on the databases 108-110. The database connector 102 can then track these alerts and/or send a further alert to a system administrator to let them know about the actions performed.

Figure 7:
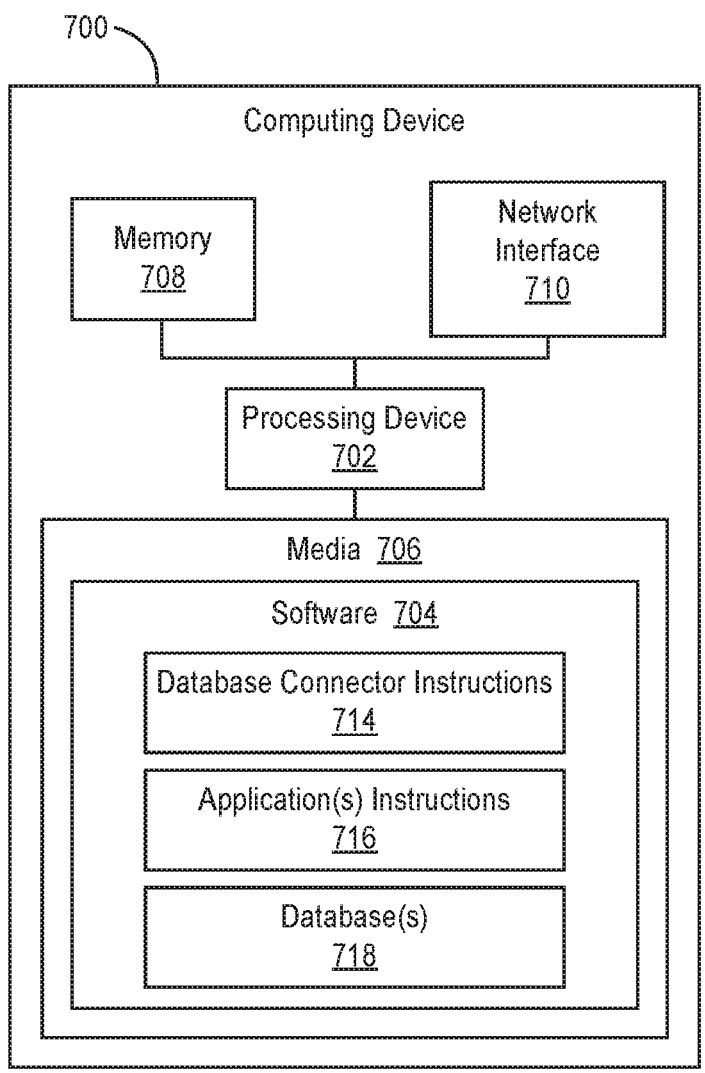
FIG. 7 is a block diagram of an example computing device for implementing the database connector, applications, and databases of FIG. 1

FIG. 7 is a block diagram of an example computing device 700 on which the applications 104-106, database connector 102, and/or databases 108-110 can be executed. Device 700 includes one or more processing devices 702 for executing instructions 704. The one or more processing devices 702 can include a general-purpose processor or a special purpose processor. The instructions 704 are stored (or otherwise embodied) on or in an appropriate storage medium or media 706 (such as flash or other non-volatile memory) from which the instructions 704 are readable by the processing device(s) 702 for execution thereby. The device 700 also includes memory 708 that is coupled to the processing device(s) 702 for storing instructions (and related data) during execution by the processing device(s) 702. Memory 708 comprises, in one implementation, any suitable form of random access memory (RAM) now known or later developed, such as dynamic random-access memory (DRAM). In other implementations, other types of memory are used. The device 700 also includes a network interface 710 for communicatively coupling the device 700 to other devices or networks. The instructions 704 can include database connector instructions 714 that are configured to cause the processing device(s) 702 to implement the functions of the database connector 102 described herein. Also on the media 706 can be one or more applications 716 and one or more databases 718 as described above.

In an example, the instructions 704 or a portion thereof (e.g., the database connector instructions 714) can be stored or otherwise embodied on a computer readable medium that is distinct from the device 700 and loaded onto the device 700 for use. Such computer readable media can be any suitable computer readable media such as a magnetic media such as a hard disk drive (HDD), optical media such as a CD, DVD, Blu-Ray disk, or a non-volatile electric media such as a solid-state drive (SDD), flash media, or EEPROM. Such computer readable media can be standalone media (e.g., a USB stick or CD) or can be computer readable media within a computing device (e.g., a server or network accessible storage).

What is claimed is:

1. A method of tracking provenance information for data in a database, the method comprising:
    storing data in a first one or more cells of a database;
    translating provenance information for the data into a new block for a provenance blockchain corresponding to the first one or more cells;
    storing the new block in the database;
    encrypting the provenance information in the new block if the data is encrypted prior to storing in the first one or more cells; and leaving the provenance information as plaintext in the new block if the data is not encrypted prior to storing in the first one or more cells.

2. The method of claim 1, wherein the provenance information includes one or more of information indicating why the data was changed, information indicating when the data was changed, and information indicating what change was made to the data.

3. The method of claim 1, comprising:
receiving the data from an application prior to storing the data in the first one or more cells.

4. The method of claim 3, wherein the provenance information includes information indicative of what change was made to the data, wherein the change that was made to the data is determined independently of the application providing the data by comparing the data from the application to corresponding existing data in the database.

5. The method of claim 3, wherein at least a portion of the provenance information is received from the application.

6. The method of claim 3, wherein at least a portion of the provenance information is received from a user via a prompt.

7. The method of claim 1, comprising:
retrieving the data from the database; and
accessing the blockchain to identify the provenance information for the data.

8. The method of claim 7, comprising:
passing the data and the provenance information to an application requesting the data.

9. A program product comprising:
a non-transitory processor readable medium having software stored thereon, the software, when executed by one or more processing devices, configured to:
receive from an application data for storing in a first one or more cells of a database;
store the data in the first one or more cells of a database;
translate provenance information for the data into a new block for a provenance blockchain corresponding to the first one or more cells;
store the new block in the database;
encrypt the provenance information in the new block if the data is encrypted prior to storing in the first one or more cells; and
leave the provenance information as plaintext in the new block if the data is not encrypted prior to storing in the first one or more cells.

10. The program product of claim 9, wherein the provenance information includes one or more of information indicating why the data was changed, information indicating when the data was changed, and information indicating what change was made to the data.

11. The program product of claim 9, wherein the provenance information includes information indicative of what change was made to the data, wherein the change that was made to the data is determined independently of the application providing the data by comparing the data from the application to corresponding existing data in the database.

12. The program product of claim 9, wherein at least a portion of the provenance information is received from the application.

13. The program product of claim 9, wherein at least a portion of the provenance information is received from a user via a prompt.

14. The program product of claim 9, wherein the software is configured to:
retrieve the data from the database; and
access the blockchain to identify the provenance information for the data.

15. The program product of claim 14, wherein the software is configured to:
pass the data and the provenance information to an application requesting the data.

16. A computing device comprising:
one or more processing devices;
storage media communicatively coupled to the one or more processing devices, the storage media including software stored thereon, the software, when executed by the one or more processing devices, configured to:
receive from an application data for storing in a first one or more cells of a database;
store the data in the first one or more cells of a database;
translate provenance information for the data into a new block for a provenance blockchain corresponding to the first one or more cells; and
store the new block in the database;
encrypt the provenance information in the new block if the data is encrypted prior to storing in the first one or more cells; and
leave the provenance information as plaintext in the new block if the data is not encrypted prior to storing in the first one or more cells.

17. The computing device of claim 16, wherein the provenance information includes one or more of information indicating why the data was changed, information indicating when the data was changed, and information indicating what change was made to the data.

18. The computing device of claim 16, wherein the provenance information includes information indicative of what change was made to the data, wherein the change that was made to the data is determined independently of the application providing the data by comparing the data from the application to corresponding existing data in the database.

* * * * *